Figure 1:
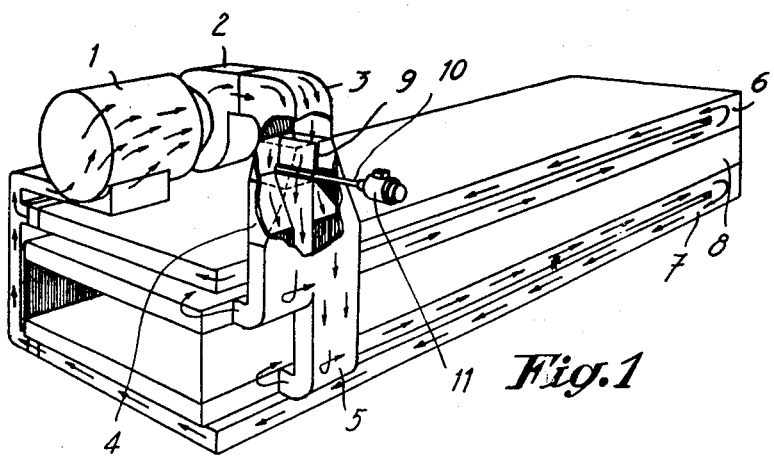

Nov. 29, 1960  H. T. G. OOMS  2,961,976
ARRANGEMENT FOR THE DISTRIBUTION AND REGULATION
OF THE HEATING FLUID IN BAKER'S
OVENS AND THE LIKE
Filed Oct. 18, 1956

H. T. G. Ooms, INVENTOR

PER Richards Geier
ATTORNEYS

United States Patent Office 2,961,976
Patented Nov. 29, 1960

2,961,976

ARRANGEMENT FOR THE DISTRIBUTION AND REGULATION OF THE HEATING FLUID IN BAKER'S OVENS AND THE LIKE

Hugo Theodore Guillaume Ooms, 4 Ave. des Lilas, Antwerp, Belgium

Filed Oct. 18, 1956, Ser. No. 616,683

Claims priority, application Belgium Mar. 30, 1956

2 Claims. (Cl. 107—63)

The invention relates to the heating technique of ovens with radiation heating, more particularly to the ovens of this kind in which the baking chamber is comprised between two horizontal walls arranged as flat boxes or pipes, through which the heating fluid circulates.

It is well known that much importance must be attached to the possibility of individually regulating the heat radiation of both horizontal walls according to the kind of product to be baked.

It has in general been considered possible to individually regulate the heat transferred by such radiant heating walls by varying or controlling the feed of heating fluid in such a way, that the latter though being supplied in a continuous flow, is subject to quantitative variation. This general method is inevitably affected with the drawback of requiring, in a way, a variable output of calories, whereby the control of the heating system is rendered particularly critical, if not impossible, whilst relatively high losses are incurred. Moreover, the response of the heating chamber to the controlling function is particularly uncertain due to the inevitable variations in temperature of the top and bottom wall respectively.

The process according to the invention fundamentally departs from the usual methods in that, for each heating box, the quantity of heat required in practice for ensuring a rational heating in accordance with the products to be baked, is first determined; use is made of a heat generator adapted to supply, during the baking operation, the total number of calories required by both the upper and lower heating box, the one and the other of said boxes being periodically connected to said heat generator each in turn, the alternate communication periods being duly determined in advance according to the ratio of the heat quantities required for the one and the other of said boxes.

Said process fundamentally departs from the methods currently used, in that the heating boxes are alternately connected with the heat generator. By rationally determining the periodicity of the successive communication periods the supply of calories to each box may automatically and very exactly be adjusted in order to fulfill the specific requirements of the baking process within the chamber comprised between said upper and lower horizontal heating boxes.

The invention also concerns the means whereby such a process may be applied. Said means generally comprise a heat generator constituted by a furnace with an adequate burner, a fan, flues connecting said fan with each of said heating boxes, and between said fan and the inlets of said flues a device capable of closing alternately the one and the other of said flues, while each time one of said flues is kept in direct communication with said fan. The device thus controlling the alternate opening and closing of either flue may be constituted by a clack valve, a driving motor rotating alternately in one and in the other sense, and timing means controlling the electrical circuit connections for said driving motor. The timing control means may provide for variable programming, in a known way.

It is evident that for the application of the process according to the invention essentially different means such as electromechanical devices or others may be employed, on the understanding that any means may be used which is capable of alternately putting in communication with the heat generator the one and the other of the heating boxes of the baking chamber of a baker's oven, biscuit baking oven or similar oven, according to a preestablished and variable program.

Figure 2:
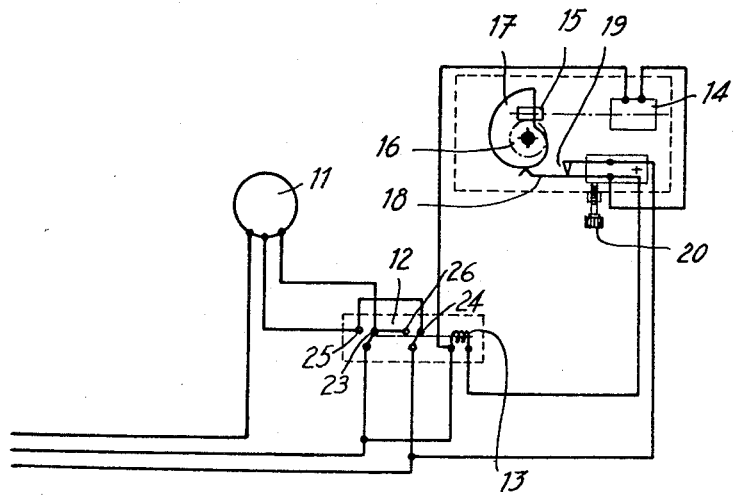

Only by way of an example therefore, and without any limitation of any kind, an embodiment will hereinafter be described in detail, with reference to the accompanying drawing, wherein:

Figure 1 shows, in a schematical and conventional way, a perspective view of the essential elements of a baker's oven, biscuit baking oven or the like, with which the process according to the invention may be put into practice; and Figure 2 is a succinct schematic representation of a device for controlling, according to a predetermined program, the distribution of the calories between the heating boxes delimiting the baking chamber.

In the schematic view of Figure 1 the heat generator has been represented by the chamber 1 comprising, in a known way, at least one burner and the necessary arrangements for heating the air and conducting the heated air towards the fan 2; the outlet 3 of the fan covers the inlets of both flues 4—5 adapted to feed the upper heating box 6 and the lower heating box 7 respectively, said boxes delimiting the baking chamber 8 at the top and at the bottom respectively.

At the junction between the outlet 3 of the fan and the inlets of the flues 4 and 5, a clack valve 9 is provided, being mounted on the shaft 10 of an electric motor 11. Said clack valve 9 is adapted to shut off alternately the inlets of the flues 4 and 5. The supply circuit of the electric motor 11 is controlled by an electro-mechanical programming device, whereby the periodicity of the movements of the clack valve 9, i.e. the frequency and the closing period of the one, and the opening period of the other of said flues, and conversely, are determined according to a pre-established program. Said electromechanical programming device may e.g. be of the kind as schematically indicated in Figure 2. In this case the feeding circuit of the motor 11 is controlled by a changeover switch 12, being controlled in turn by an electromagnetic device 13, the operating circuit of which is opened or closed by a timing device adapted to be adjusted in advance. Said device, in the case illustrated, is constituted by a small electric motor 14, driving the cam 17, through a small reduction gear, schematically represented by the worm 15 and the worm wheel 16. Said cam in turn controls continuously the position of a contact spring 18 of a switch 19, the opening and closing positions of which are also predetermined by an adjusting device 20. As the cam 17 is driven continuously, it is easy, in this way, to control the frequency and the duration of the opening of switch 19, which indirectly controls the direction of rotation of the motor 11 determining the characteristic positions of the clack valve 9.

The motor 11 is of the three phase reversing type. The electro-magnetic device 13 controls the change-over switch 12 which in turn controls the feeding circuit of the motor 11. In the attracted position shown in Figure 2, the switch 12 is operatively connected with the terminals 23 and 24. On the other hand, when the electromagnetic device 13 is switched off, the switch 12 engages the terminals 25 and 26, so that the rotation of the motor 11 is reversed. The operating circuit of the electromagnetic device 13 is actuated by the device consisting of members 14 to 20 shown in Figure 2.

Whichever driving device may be utilized, said clack valve 9 should be such as to cause all of the heating fluid to be supplied alternately to the one and to the other of the heating boxes 6—7, in accordance with a duly pre-established program, made up in agreement with the total number of calories required, in different conditions, for said boxes 6—7 for ensuring a successful baking operation. It will be observed that, in this way, the total caloric supply produced by the heat generator 1 is a constant and that all of the heating fluid is either transmitted to the one or to the other of said boxes 6—7. This process therefore is extremely convenient and flexible it being possible to change the adjustment very easily in accordance with the different baking operations in view.

This same process may of course be applied, whichever heat generator, or whatever kind of radiation oven is employed, and whatever means is used in order to pre-establish the successive movements of the clack valve controlling the switching of the whole of the heating fluid supply.

What I claim is:

1. Heating arrangement for a baking oven comprising a baking enclosure adapted to contain the products to be baked in said oven, an upper and a lower heating box consituting the top and bottom wall respectively of said baking enclosure and adapted to heat by radiation the products contained in said baking enclosure, a heat generator producing a heating fluid, a fan having an intake for the heating fluid produced by said heat generator, as well as an outlet pipe, said fan being adapted to produce a flow of heating fluid through said outlet pipe, a pair of flues connected in parallel to said outlet pipe of said fan and connected to conduct the heating fluid to said upper and said lower heating box respectively, a clack valve mounted on a shaft and disposed at the junction between said outlet pipe and said flues and adapted to close either the one or the other of said flues, a motor capable of rotating in both directions, means to transmit the rotation of said motor to said shaft of said clack valve, and means for controlling the rotation of said motor alternately in the one and in the other direction during successive periods of predetermined lengths.

2. Heating arrangement for a baking oven comprising a baking enclosure adapted to contain the products to be baked in said oven, an upper and a lower heating box constituting the top and bottom wall respectively of said baking enclosure and adapted to heat by radiation the products contained in said baking enclosure, a heat generator producing a heating fluid, a fan having an intake for the heating fluid produced by said heat generator, as well as an outlet pipe, said fan being adapted to produce a flow of heating fluid through said outlet pipe, a pair of flues connected in parallel to said outlet pipe of said fan and connected to conduct the heating fluid to said upper and said lower heating box respectively, a clack valve mounted on a shaft and disposed at the junction between said outlet pipe and said flues and adapted to close either the one or the other of said flues, an electric motor capable of rotating in both directions, means to transmit the rotation of said motor to said shaft of said clack valve, a reversing switch controlling the electrical circuit connections of said motor and adapted to reverse the direction of rotation of said motor, an electro-mechanical device adapted to control the position of said reversing switch, and including a timing device controlling the operation of said electro-mechanical device according to a predetermined program.

References Cited in the file of this patent

UNITED STATES PATENTS

| 1,801,740 | Halsey | Apr. 21, 1931 |
| 2,707,925 | Naylor | May 10, 1955 |
| 2,767,668 | Spooner | Oct. 23, 1956 |
| 2,790,604 | Felcus | Apr. 30, 1957 |

FOREIGN PATENTS

| 283,176 | Italy | Mar. 4, 1931 |
| 478,682 | Great Britain | Jan. 24, 1938 |